(12) United States Patent
Button et al.

(10) Patent No.: US 8,130,994 B2
(45) Date of Patent: Mar. 6, 2012

(54) WAVEGUIDE

(75) Inventors: Douglas J. Button, Simi Valley, CA (US); Alexander V. Salvatti, Canoga Park, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 932 days.

(21) Appl. No.: 12/141,013

(22) Filed: Jun. 17, 2008

(65) Prior Publication Data

US 2009/0310808 A1 Dec. 17, 2009

(51) Int. Cl.
*H04R 1/20* (2006.01)

(52) U.S. Cl. ........ 381/339; 381/337; 381/340; 381/342; 381/347; 181/155; 181/156; 181/175; 181/184

(58) Field of Classification Search ................ 381/339, 381/337, 340, 342, 347; 181/155, 156, 157, 181/175, 184, 185, 191, 198
See application file for complete search history.

(56) References Cited

U.S. PATENT DOCUMENTS

| | | | | |
|---|---|---|---|---|
| 3,122,214 A * | 2/1964 | Robbins | ................ | 181/155 |
| 3,852,529 A * | 12/1974 | Schafft | ................ | 381/75 |
| 4,283,606 A | 8/1981 | Buck | | |
| 4,619,342 A | 10/1986 | Buck | | |
| 4,706,295 A * | 11/1987 | Putnam et al. | ................ | 381/342 |
| 5,117,462 A * | 5/1992 | Bie | ................ | 381/343 |
| 5,313,525 A * | 5/1994 | Klasco | ................ | 381/350 |
| 5,606,297 A * | 2/1997 | Phillips | ................ | 333/141 |
| 5,737,435 A * | 4/1998 | De Poortere et al. | ........ | 381/340 |
| 5,740,259 A * | 4/1998 | Dunn | ................ | 381/332 |
| 5,742,696 A * | 4/1998 | Walton | ................ | 381/340 |
| 6,094,495 A * | 7/2000 | Rocha | ................ | 381/340 |
| D450,778 S | 11/2001 | Engebretson | | |
| 6,320,970 B1 * | 11/2001 | Czerwinski et al. | ......... | 381/343 |
| 6,466,680 B1 * | 10/2002 | Gelow et al. | ................ | 381/340 |
| 7,010,138 B1 * | 3/2006 | Harris et al. | ................ | 381/337 |
| 7,039,211 B2 * | 5/2006 | Werner | ................ | 381/343 |
| 7,072,481 B2 * | 7/2006 | Button et al. | ................ | 381/343 |
| 7,142,680 B2 | 11/2006 | Gelow et al. | | |
| 7,178,629 B2 | 2/2007 | Vincenot | | |
| 7,207,413 B2 * | 4/2007 | Plummer | ................ | 181/199 |

(Continued)

FOREIGN PATENT DOCUMENTS

EP 1417859 B1 9/2008

(Continued)

OTHER PUBLICATIONS

Smith, Bob H.; An Investigation of the Air Chamber of Horn Type Loudspeakers; The Journal of the Acoustical Society of America; vol. 25, No. 2; Mar. 1953; pp. 305-312.

(Continued)

*Primary Examiner* — Anh Mai
*Assistant Examiner* — Joselito Baisa
(74) *Attorney, Agent, or Firm* — The Eclipse Group LLP

(57) ABSTRACT

A waveguide configured to function as a high frequency waveguide for a high frequency sound source mounted to the waveguide, and to function as an acoustical low pass filter for a low frequency sound source mounted behind the waveguide in a multi-way loudspeaker system. The waveguide includes openings that overlay the vibrating surface of the low frequency source. The openings are configured by selection of various geometrical parameters to tailor filtering characteristics as desired.

10 Claims, 18 Drawing Sheets

U.S. PATENT DOCUMENTS

| | | | |
|---|---|---|---|
| 7,252,176 B2 * | 8/2007 | Moore | 181/199 |
| 7,324,654 B2 | 1/2008 | Opie et al. | |
| 7,324,656 B2 | 1/2008 | Iwayama et al. | |
| 7,545,946 B2 * | 6/2009 | Melanson | 381/307 |

FOREIGN PATENT DOCUMENTS

| WO | WO 03/010994 A1 | 2/2003 |
|---|---|---|

OTHER PUBLICATIONS

Kinoshita, et al.; Design of 48mm Beryllium Diaphragm Compression Driver; AES 60th Convention; May 2-5, 1978; Los Angeles; 12pp.

* cited by examiner

WAVEGUIDE

BACKGROUND OF THE INVENTION

1. Field of the Invention

This invention relates generally to multi-way loudspeaker systems, and more particularly, to waveguides used in multi-way systems.

2. Related Art

Loudspeaker systems typically include multiple speakers sized to process various ranges of the audio frequency band. For example, the high-frequency range (generally 2 kHz-20 kHz) is typically produced by tweeters. The midrange (generally 200 Hz-5 kHz) is typically produced by midrange drivers. Low-frequency ranges (generally 20 Hz-200 Hz) are typically produced by direct-radiating woofers. Loudspeaker systems are also being used in applications that call for smaller and smaller sizes. For example, it is typically preferred that wall-mounted and ceiling mounted loudspeaker systems be as small as possible.

The use of multiple speakers dedicated to different frequency ranges makes reducing the size of loudspeaker packages difficult. In addition, many loudspeaker systems include waveguides to direct sound in a desired, predetermined way. For example, a ceiling mounted loudspeaker system may include a tweeter waveguide that may distribute sound in a widely dispersed pattern, or focus the sound in a smaller area.

Multiple speakers also require crossover networks that may be complex, expensive and mounted on electronic circuit boards that may also take up substantial amount of space. There exists a need for improved loudspeaker systems that efficiently make use of limited space without sacrificing performance. There also exists a need for loudspeaker systems designed to reduce the complexity of crossover networks therefore saving cost.

SUMMARY

In view of the above, a waveguide is provided to operate as a high frequency sound waveguide and an acoustical low pass filter for a low frequency sound driver. According to one implementation, a waveguide for a loudspeaker system is provided. The waveguide includes an outer surface shaped to direct sound waves radiated from a sound source positioned at an opening in the waveguide, and an inner surface on a side opposite the outer surface. The waveguide includes a plurality of openings, each opening extending from the inner surface to the outer surface. The plurality of openings are disposed to overlay an acoustical radiating surface of a second sound source mounted adjacent to the inner surface of the waveguide. The openings configured to enable the waveguide to function as an acoustical low pass filter for sound radiated through the openings from the second sound source.

According to another implementation, a loudspeaker system includes a first sound source having a acoustical radiating surface, a second sound source, and a waveguide mounted in front of the second sound source. The waveguide includes an outer surface shaped to direct sound waves radiated from the first sound source positioned at an opening in the waveguide, and an inner surface on a side opposite the outer surface. The waveguide includes a plurality of openings, each opening extending from the inner surface to the outer surface. The plurality of openings are disposed to overlay an acoustical radiating surface of a second sound source mounted adjacent to the inner surface of the waveguide. The openings configured to enable the waveguide to function as an acoustical low pass filter for sound radiated through the openings from the second sound source.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description of examples of the invention below can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1A:
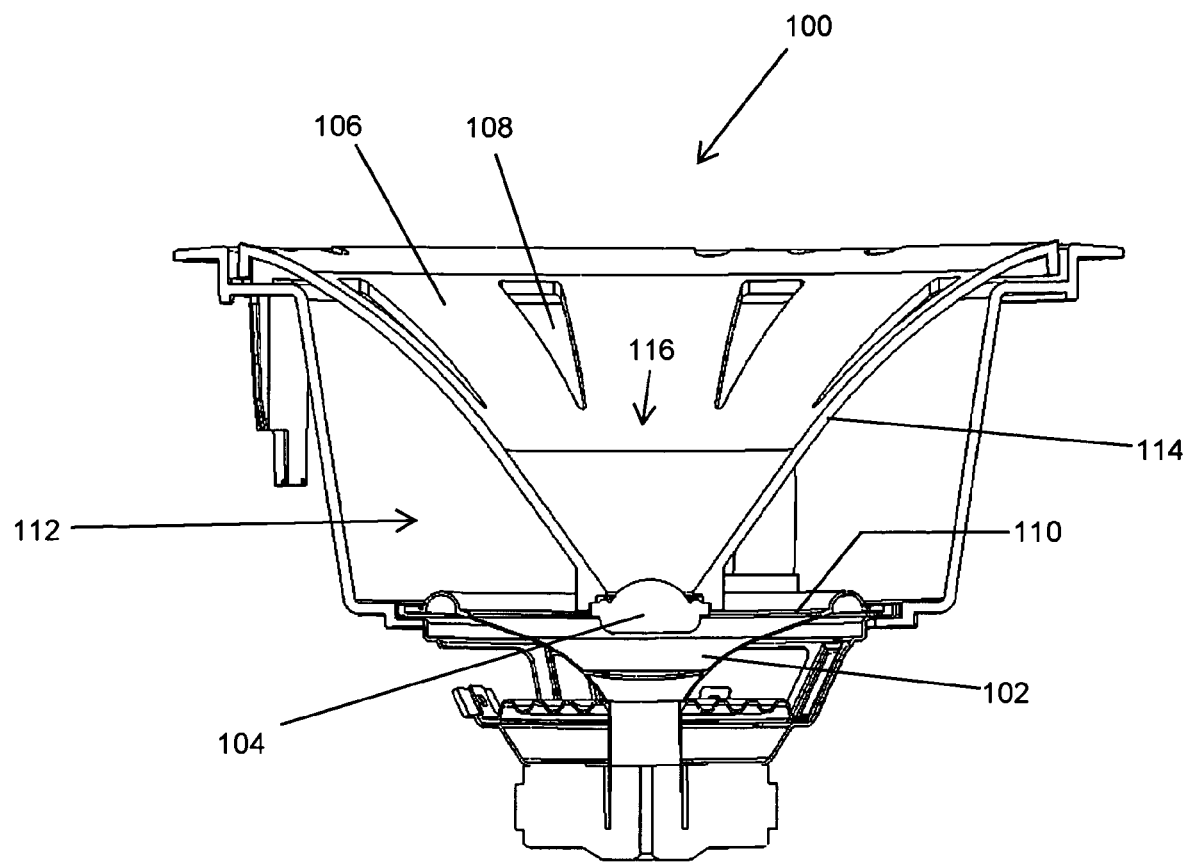
FIG. 1A is a cross-sectional and side view of an example of a loudspeaker system that implements an example of a waveguide (depicted in a side view) configured to operate as an acoustical low pass filter.
Figure 1B:
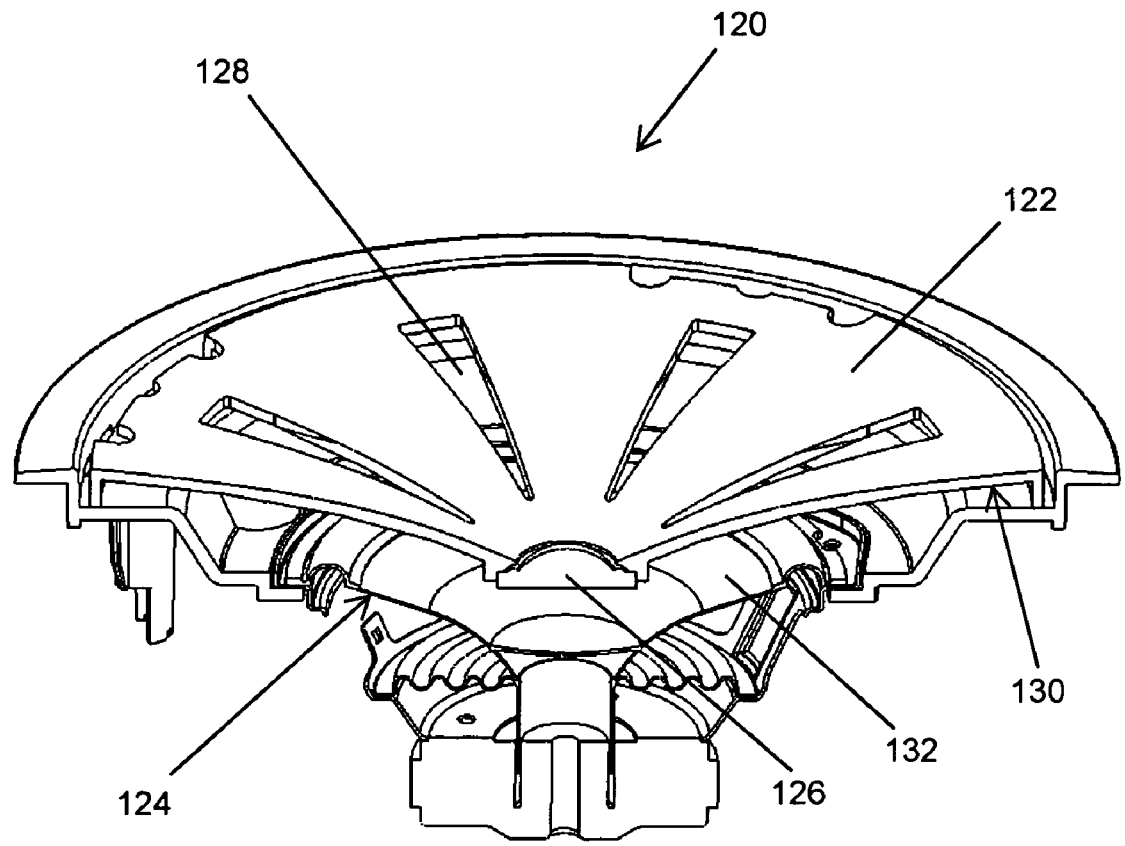
FIG. 1B is a cross-sectional and bottom perspective side view of another example of a loudspeaker system that implements another example of a waveguide (depicted in a side view) configured to operate as an acoustical low pass filter.
Figure 1C:
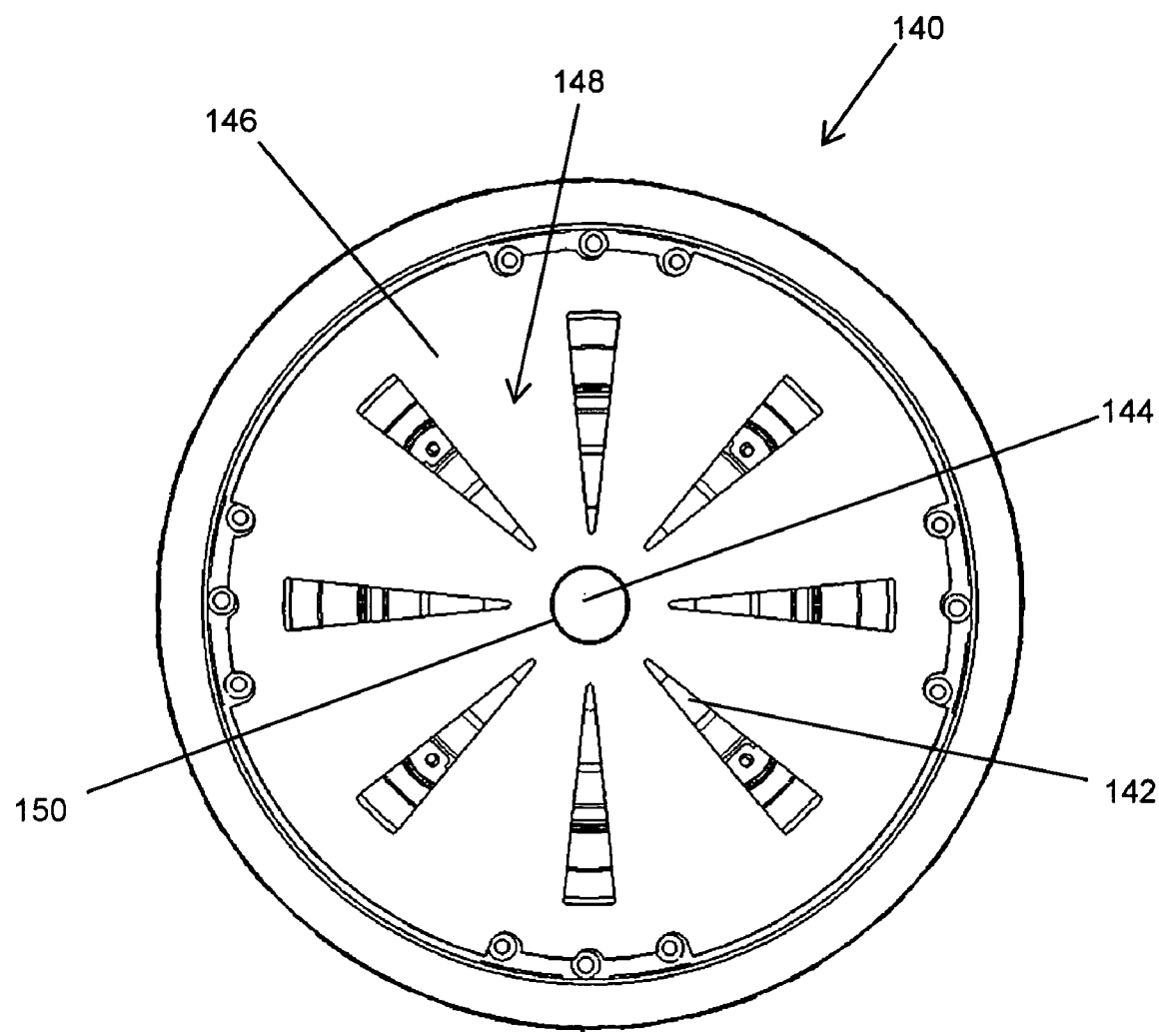
FIG. 1C is a top view of the loudspeaker system in FIG. 1A.

FIGS. 1A-1C depict examples of multi-way loudspeaker systems having at least a first sound source, a second sound source, and including a waveguide for directing high frequency sounds while operating as an acoustical low pass filter. The first sound source may be any high frequency sound transducer such as a tweeter, or a compression driver, for example. The second sound source may be a low frequency sound source, which may be any sound transducer such as a woofer. The second sound source may also be a reflector, which is an acoustic radiating surface that does not receive a signal, is not driven by a voice coil, and is driven instead by sound pressure created by a driven woofer in a woofer and/or sub-woofer enclosure. The waveguide may be attached to the front of the woofer with the tweeter fastened to or mounted or otherwise held to the waveguide in a position to allow the waveguide to direct the sound produced by the tweeter, which is generally high frequency sound.

The waveguide also operates as an acoustical low pass filter for the woofer. The waveguide is a perforated obstruction placed in front of the woofer to create an acoustic loading of the woofer, making the woofer behave like a compression driver implemented using a phase plug. Compression drivers are generally used as midrange or high-frequency specific devices and the phase plugs are designed maximize bandwidth to extend into higher frequencies. In examples described below, the woofer and perforated waveguide combination operate in a manner similar to a compression driver, except that the waveguide provides acoustical low pass filtering. In example implementations of the waveguide described below, the specific geometry of the openings and obstructions adjacent to the vibrating surface determines the acoustic pressure vs. frequency characteristic. This characteristic frequency response may be modeled through a circuit analysis of an appropriate analogous circuit model as discussed below with reference to FIGS. 4A and 4B.

FIG. 1A is a cross-sectional and side view of an example of a loudspeaker system 100 that implements an example of a waveguide 106 (depicted in a side view) configured to operate as an acoustical low pass filter. The loudspeaker system 100 includes a woofer 102 mounted behind the waveguide 106 and a tweeter 104 mounted to generate high frequency sound within the waveguide 106 such that the waveguide 106 projects the high frequency sound outward towards the listening area. The waveguide 106 also includes openings 108 distributed on the surface of the waveguide 106. The woofer 102 includes an acoustic radiating surface 110, which is excited by a voice coil to move and create sound waves. The openings 108 provide channels through which the low frequency sound generated by the acoustic radiating surface 110 behind the waveguide 106 is radiated. The area between the openings 108 on the waveguide 106 creates a compression chamber in a space between an inner surface 114 of the waveguide 106 and the acoustic radiating surface 110 of the woofer 102, shown generally at 112. The size and geometry of the compression chamber determine the sound pressure level and frequency response characteristics of the woofer 102. The openings 108 also affect the performance of the waveguide 106 because tweeter waveguides generally perform best with a minimal amount of discontinuities on the surface that guides the sound. The openings 108 present discontinuities that are accounted for in adjusting the geometry and dimensions of the waveguide 106 and the size and location of the openings 108.

In the loudspeaker system 100 in FIG. 1A, the woofer 102 and tweeter 104 are substantially aligned to generate sound in substantially coaxially aligned patterns. The loudspeaker system 100 generates sound that may extend across the full audible frequency range while minimizing the frontal surface area. Typically, woofers and tweeters radiate sound in unaligned patterns because they are typically mounted to project through their own speaker surface areas. This requires either separate enclosures for each component (woofer, tweeter, and midrange, if used), or an enclosure having enough surface area on the surface of projection to accommodate the woofer, tweeter and any other sound projecting component (such as a midrange speaker) required to generate the full audible frequency range. The loudspeaker system 100 in FIG. 1A only requires an enclosure with enough surface area to accommodate the widest component (typically, the woofer). The waveguide 106 in FIG. 1A has a long throw (deep) profile for projecting the high frequency sound over a longer distance with narrower pattern for more focused coverage of the intended area.

FIG. 1B is a cross-sectional and top perspective side view of another example of a loudspeaker system 120 that implements another example of a waveguide 122 (depicted in a side view) configured to operate as an acoustical low pass filter. The second loudspeaker system 120 in FIG. 1B also includes a woofer 124 and a tweeter 126 mounted to project sound in substantially aligned sound patterns. The waveguide 122 in FIG. 1B has a low profile to generate a more widely dispersed sound pattern than that of the waveguide 106 in FIG. 1A. The waveguide 122 also has openings 128 to permit low frequency sound generated by the woofer 124 to radiate and closed areas between the openings 128 to provide a compression chamber between an inner surface 130 of the waveguide 122 and an acoustic radiating surface 132 on the woofer 124.

FIG. 1C is a top view of a loudspeaker system 140 of the type described in FIGS. 1A and 1B. The loudspeaker system 140 in FIG. 1C includes a woofer 142, a tweeter 144, and a waveguide 146. FIG. 1C shows the woofer 142 behind the waveguide 146 and the tweeter 144 projecting from the center of the waveguide 146. The waveguide 146 includes an outer surface 148 extending from a center opening 150 in the waveguide 146 to direct sound waves generated from the tweeter 144 mounted in the central opening 150. As described with reference to FIG. 1A, the waveguide 146 also has an inner surface similar to the inner surface 114 in FIG. 1A, which is the surface of the waveguide 146 facing away from the listening area. The inner surface serves as the boundary for the compression chamber in front of the woofer 102. Similarly, the waveguide 146 in FIG. 1C includes an inner surface that also serves as the boundary for the compression chamber in front of the woofer 142.

In the examples shown in FIGS. 1A-1C, the waveguide 106, 122, 146 has a curved surface profile, and the inner and outer surfaces, which are shaped similarly to provide a similar, or even constant, wall thickness throughout the waveguide 106, 122, 146. In other implementations, the waveguide does not have a similar wall thickness throughout. The outer surface 148, for example, may include features, or other details that provide additional sound projecting functions. The shape of the inner surface 114 may also be such that it does not result in a constant wall thickness. In some cases, it may be desirable to allow the shape of the inner surface to closely follow the contour of the woofer diaphragm, for example, or any other profile that may result in advantageous performance benefits, including control of standing waves or reflections due to the air cavity formed between the woofer diaphragm and the inner wall surface.

The waveguides 106, 122, 146 shown in FIGS. 1A-1C include openings to permit the low frequency sound generated by the woofer to radiate outward; the area between the openings provided a compression chamber for the woofer. In this example the openings are uniformly spaced equidistant from one another, but it is possible that unequal spacing could be used if it results in an advantageous frequency response characteristic for the particular application in question.

The loudspeaker systems 100, 120, 140 in FIGS. 1A-1C each have the woofers 102, 124, 142 and tweeter 104, 126, 144 substantially aligned along an axis and separated by the waveguide 106, 122, 146. The woofer 102, 124, 142 is mounted behind the waveguide 106, 122, 146 in each loudspeaker system 100, 120, 140. Each waveguide 106, 122, 146 includes openings 108, 128, 142, which allow the low frequency sound generated by the woofer 102, 124, 142 to radiate outward. The area between the openings 108, 128, 142 creates a compression chamber to tailor the sound pressure characteristic created by the woofer. The openings 108, 128, 142 may also be configured as described below in example implementations to enable the waveguide 106, 122, 146 to operate as an acoustical filter, which allows low frequencies to pass. Such operation as a low pass filter reduces the design requirements for any crossover networks that may be required to drive the woofer 102, 124, 142 and the tweeter 104, 126, 144. In some examples, this acoustical filter may be sufficient to eliminate the need for any crossover network altogether.

Figure 2A:
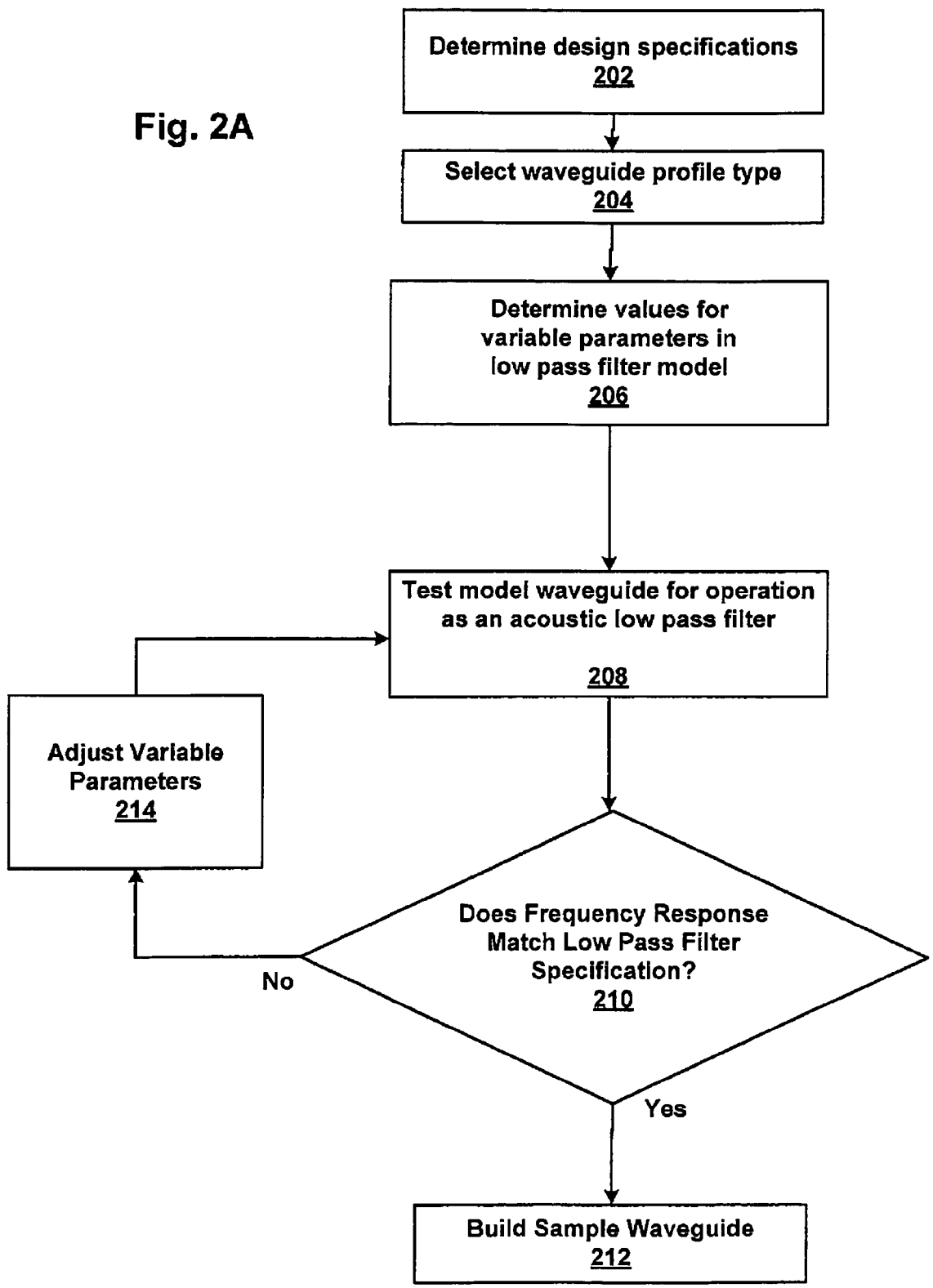
FIGS. 2A-2B are flowcharts illustrating operation of an example method of configuring a waveguide to operate with a tweeter and as an acoustical low pass filter.
Figure 2B:
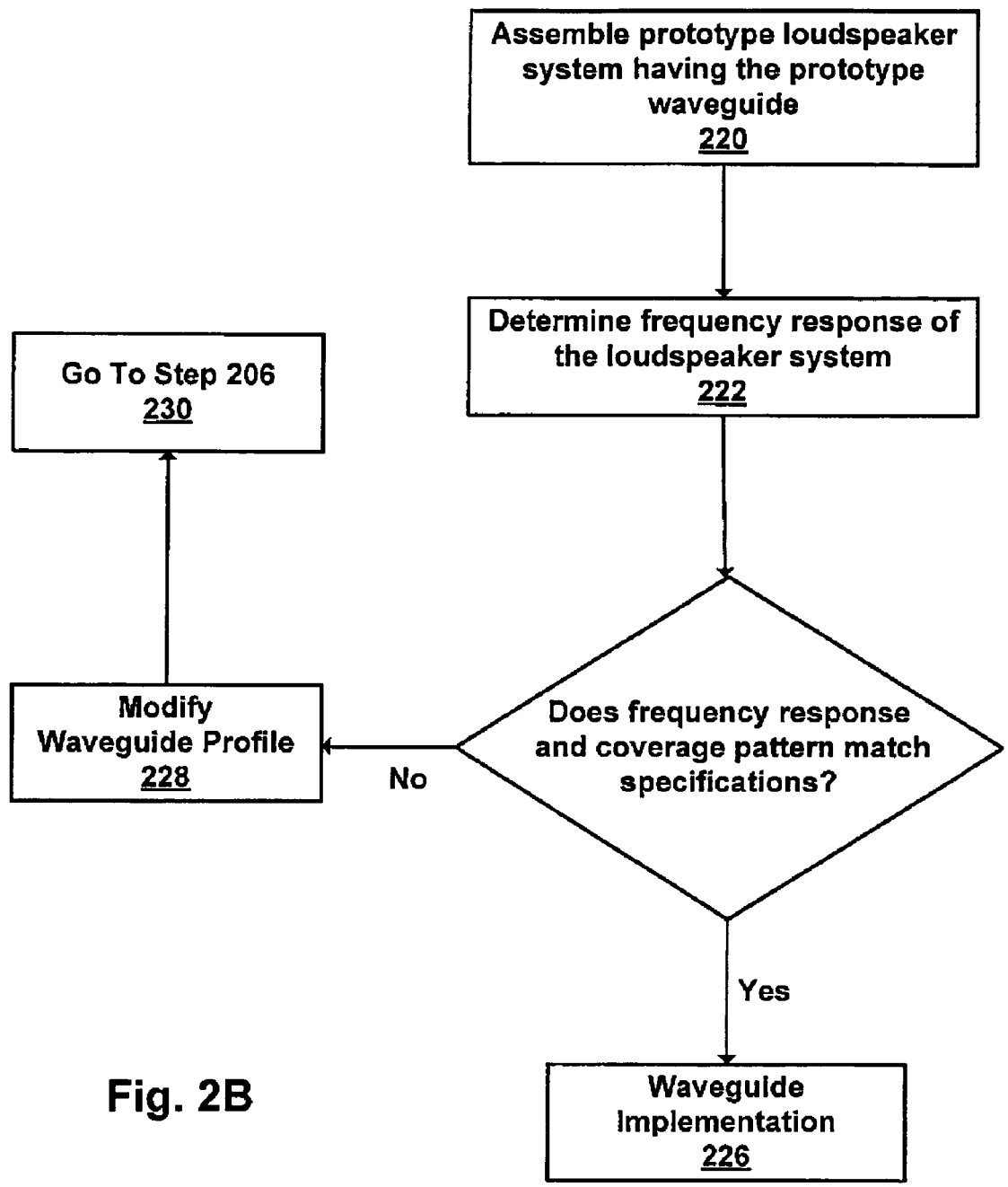

The waveguide 106, 122, 146 provides the loudspeaker system 100, 120, 140 with tweeter waveguide functions as well as acoustical low pass filter functions by selecting parameters relating to the construction of the waveguide, modeling the parameters to determine their effect, constructing a prototype, and testing the prototype to determine the extent to which the prototype meets a set of predetermined design specifications. The waveguide 106, 122, 146 and loudspeaker systems 100, 120, 140 described herein may be used in any type of environment. An example implementation that would make use of the loudspeaker system 100, 120, 140 is a ceiling mounted loudspeaker. Another example application is a low cost monitoring loudspeaker FIGS. 2A-2B are flowcharts illustrating operation of an example method of configuring a waveguide to operate with a tweeter and as an acoustical low pass filter. The first step, step 202, in configuring the waveguide 106 is to identify performance and design specifications for the loudspeaker system 100. In particular, the parameters and components that should be determined at this point may include: dimensions of the enclosure, specific woofers and tweeters to be included, and application, such as a ceiling mounted speaker or a wall-mounted speaker, or a speaker with a free-standing enclosure, etc. The performance specifications that should be determined include frequency response at each sub-range of frequencies.

At step 204, a waveguide profile type is selected. For example, the loudspeaker system may require a long throw type profile, or a wide dispersion type profile. The shape of the waveguide may also be determined. For example, the shape may be conical, or elliptical, or of some other surface shape. The desired angular coverage pattern in degrees of the system, where the acoustical response is generally desired to be uniform across all angles in the design coverage area dictates the profile of the waveguide. The examples described here with reference to FIGS. 1-9 depict waveguides with round mouths, however, the mouth of the waveguide may be any shape including rectangular, rounded rectangular, oval, etc.

At step 206, a model of the waveguide is created, and values are selected for variable parameters that are part of the selected model. In an example implementation, the woofer and waveguide portion of the loudspeaker system may be modeled as an analogous electrical circuit where electrical components are substituted for acoustical or mechanical components, such as the circuit depicted in, and described below with reference to FIGS. 4A and 4B. The values of the components of the electric circuit may have the values of their components defined in terms of parameters that define construction details of the loudspeaker system. As described below, the electric circuit model in FIG. 4A permits selection of parameters and simulation of the model to predict the ultimate behavior of the woofer and waveguide portion of loudspeaker system. For example, several parameters may be selected as variable parameters that may be adjusted in steps or iterations. The selected variable parameters may be further selected for the effect that the parameter values have on the operation of the waveguide as an acoustic low pass filter.

At step 208, the waveguide model is tested for operation as an acoustical low pass filter. The waveguide may be tested by simulating operation of the waveguide using the set of selected variable parameters. The simulation may be performed by calculating the sound pressure level over the frequency range of operation and plotting the sound pressure level to yield a frequency response for the parameters selected. It is to be understood that example implementations are not limited to use of the model described in the examples described herein. Any other suitable model may be used, particularly if such a model reduces the configuration of the waveguide to a search for values for a few parameters that would allow the model to operate with the desired frequency response. In another example implementation, the waveguide may be built according to the specifications defined by the parameters and tested in an anechoic chamber using a physical prototype instead of an abstracted model.

At decision block 210, the frequency response of the woofer is checked to determine if it matches the low pass filter requirements. If it does, the waveguide would be constructed, and assembled in a loudspeaker system at step 212. The assembled loudspeaker system may then be further tested for performance of the waveguide as a tweeter waveguide according to the process described by the flowchart in FIG. 2B. If the frequency response of the waveguide does not meet the low pass filter requirements, the variable parameters may be adjusted at step 214. The model may then be tested at step 208 using the new adjusted variable parameters.

FIG. 2B depicts a flowchart illustrating operation of a method for analyzing a prototype waveguide for operation as a tweeter waveguide. At step 220, a prototype loudspeaker system may be assembled using a prototype waveguide constructed and built into the loudspeaker system according to specifications determined from the variable parameters selected using the method described with reference to FIG. 2A. The prototype waveguide may be constructed for prototyping purposes in a variety of ways. For example, the prototype may be machined using manual or computer aided equipment out of wood, plastic or metal, or through direct digital printing from a computer model (CAD) in metal, plastic, or wax, or any of the commonly known rapid prototyping techniques used for making physical models. Direct digital printing, also known as 3D printing, takes as input a CAD model which fully describes the geometry, and directly creates a physical model in a matter of minutes or hours with no user intervention required. These parts are suitable for limited physical testing and confirmation of design intent, and are very useful as precursors to mass production methods. In some cases the parts can even be used as a master for production molding.

At step 222, the assembled loudspeaker system may be tested to determine its frequency response over the entire range of operation. The loudspeaker system may be tested in an anechoic chamber while connected to a frequency generator. A microphone may be positioned in various positions near the loudspeaker system area of excitation. Typically, the frequency response is checked at several points in space to determine the performance both on-axis and off axis. Comparing the on and off-axis measurements allows determination of the suitability of the system to provide adequate performance over the entire intended listening area. The sound signals collected by the microphone may be plotted against the frequency settings of the frequency generator. Frequency response curves may be generated to test various aspects of the speaker operation by connecting the frequency generator to the loudspeaker system as follows:

1. Connect frequency generator to the loudspeaker system input to test overall performance of the waveguide as a tweeter waveguide and an acoustical low pass filter by matching to an ideal frequency response.
2. Connect frequency generator to woofer only to confirm operation of the waveguide as an acoustical low pass filter.
3. Connect frequency generator to tweeter only to confirm operation of the tweeter waveguide in the high frequency range.

At decision block 224, the frequency responses generated by the tests described above are analyzed to determine whether the loudspeaker system performance matches the previously determined frequency specifications. If the loudspeaker system matches the specifications, the waveguide is configured for operation and may be implemented at step 226. If the loudspeaker system does not match the specifications, the waveguide profile may be modified at step 228 and the configuration process may continue by proceeding to step 206 as shown at step 230. This iterative loop is typical in the optimization of a particular design to match the target specifications. It is noted that the design order shown in FIGS. 2A and 2B is arbitrary, i.e. the waveguide shape may be designed before or after the design of the low pass characteristic, or they may be done in parallel. The objective measurements described may be used in conjunction with subjective listening evaluations to guide the subsequent iterations.

The modification of the waveguide profile may entail selecting a profile from various preconfigured waveguide profiles. In the examples described, a basic waveguide profile has a horn-like shape and symmetrically arranged openings formed in a radial pattern around the center of the waveguide where the tweeter is mounted. The different waveguide profiles may be distinguished by:

1. Depth of the horn-like shape
2. Curvature of the horn-like shape
3. Number of openings
4. Size, shape, and position of the openings In general, the waveguide profile depends on the performance and features desired of the loudspeaker system at high frequencies. The performance on-axis is a result of the combination of the high frequency driver and its interaction with the waveguide. The off-axis performance relative to the on-axis response depends primarily on the waveguide design.

The waveguide may be designed to cover particular included angles using a variety of different approaches to waveguide design. Typically an approach to waveguide design provides general rules for choosing an approximate shape that will approximate the desired operation. A prototype may be built using the chosen shape, or profile and tested. Based on the measured performance, another iteration is made on the waveguide profile get closer to the desired operation. In one example implementation, computer simulation may be used in the iterations making the process virtual, which may reduce or eliminate the number of physical prototypes that need to be made. In an example implementation, the waveguide profile has a desired uniform coverage over 65 degrees included angle for the long-throw design, and 120 degrees for the low-profile design.

The off-axis performance of the tweeter may also be a consideration in selecting values for the variable parameters of the model used to configure the waveguide for operation as an acoustical filter. Any openings in the waveguide surface can be detrimental to the tweeter frequency response at positions in the sound field where the openings are along the line of sight between the tweeter and the microphone location. The proper selection of the sizing and placement of the openings may help minimize undesirable aberrations in the smoothness of the tweeter frequency response.

Figure 3A:
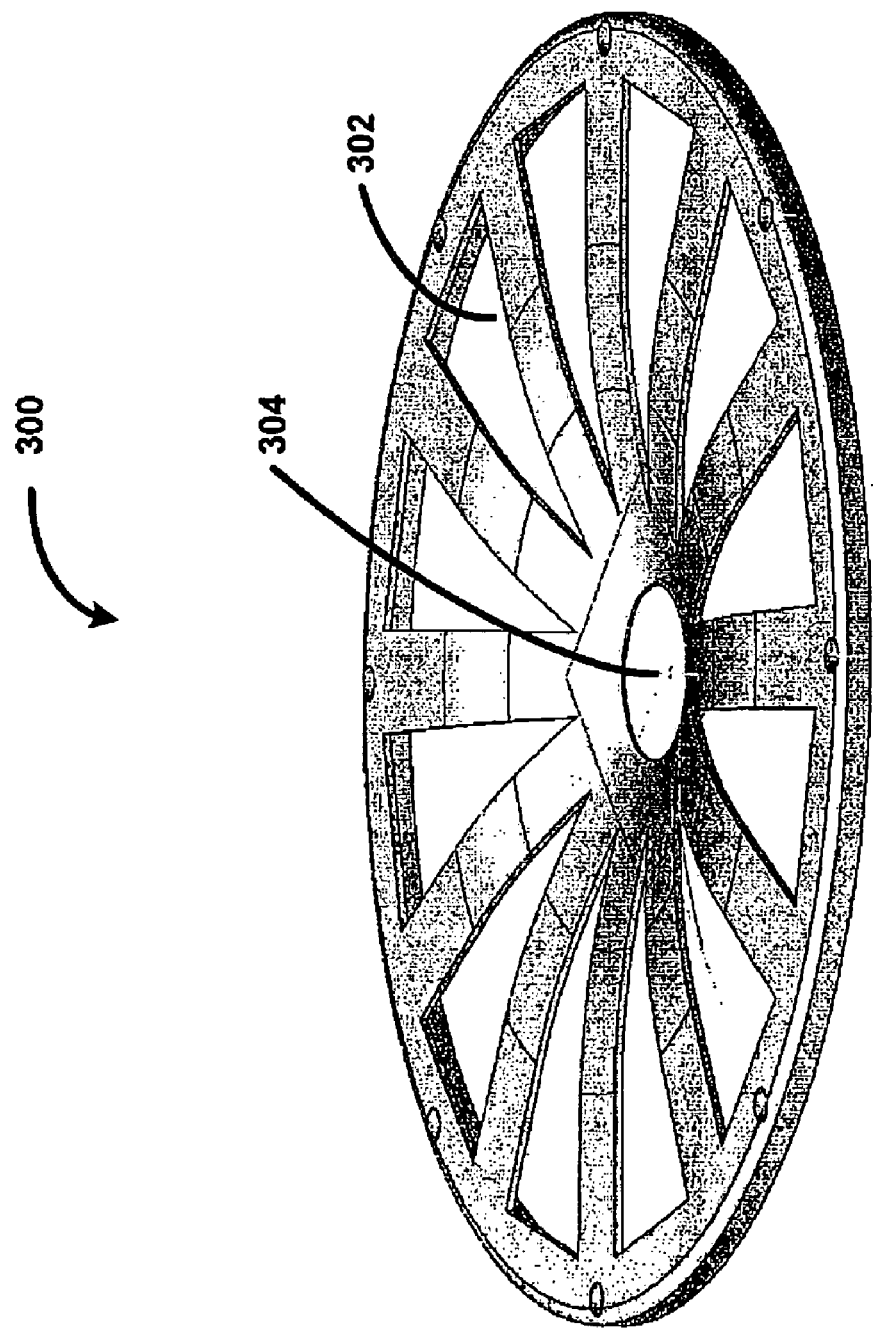
FIG. 3A is a top perspective view of an example waveguide that may be used in the loudspeaker system in FIG. 1B.
Figure 3B:
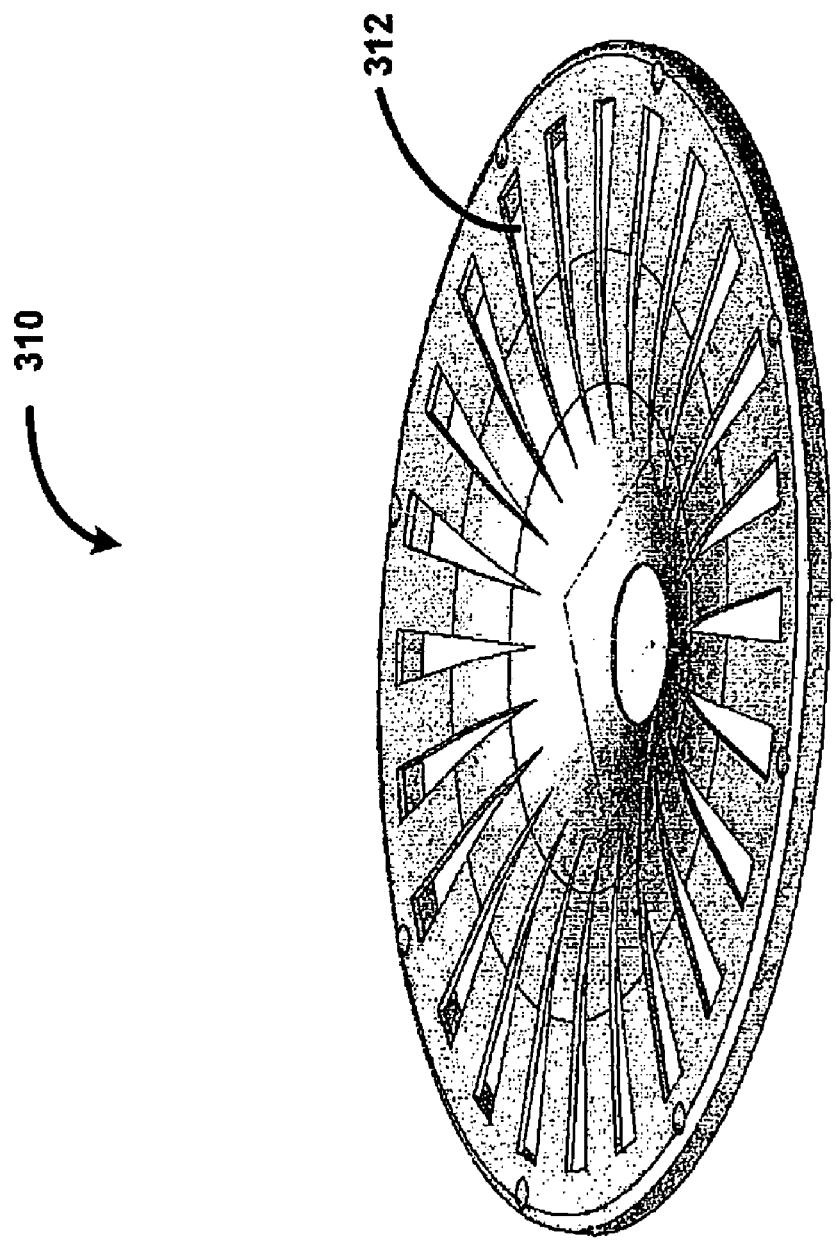
FIG. 3B is a perspective top view of another example waveguide that may be used in the loudspeaker system in FIG. 1B.
Figure 3C:
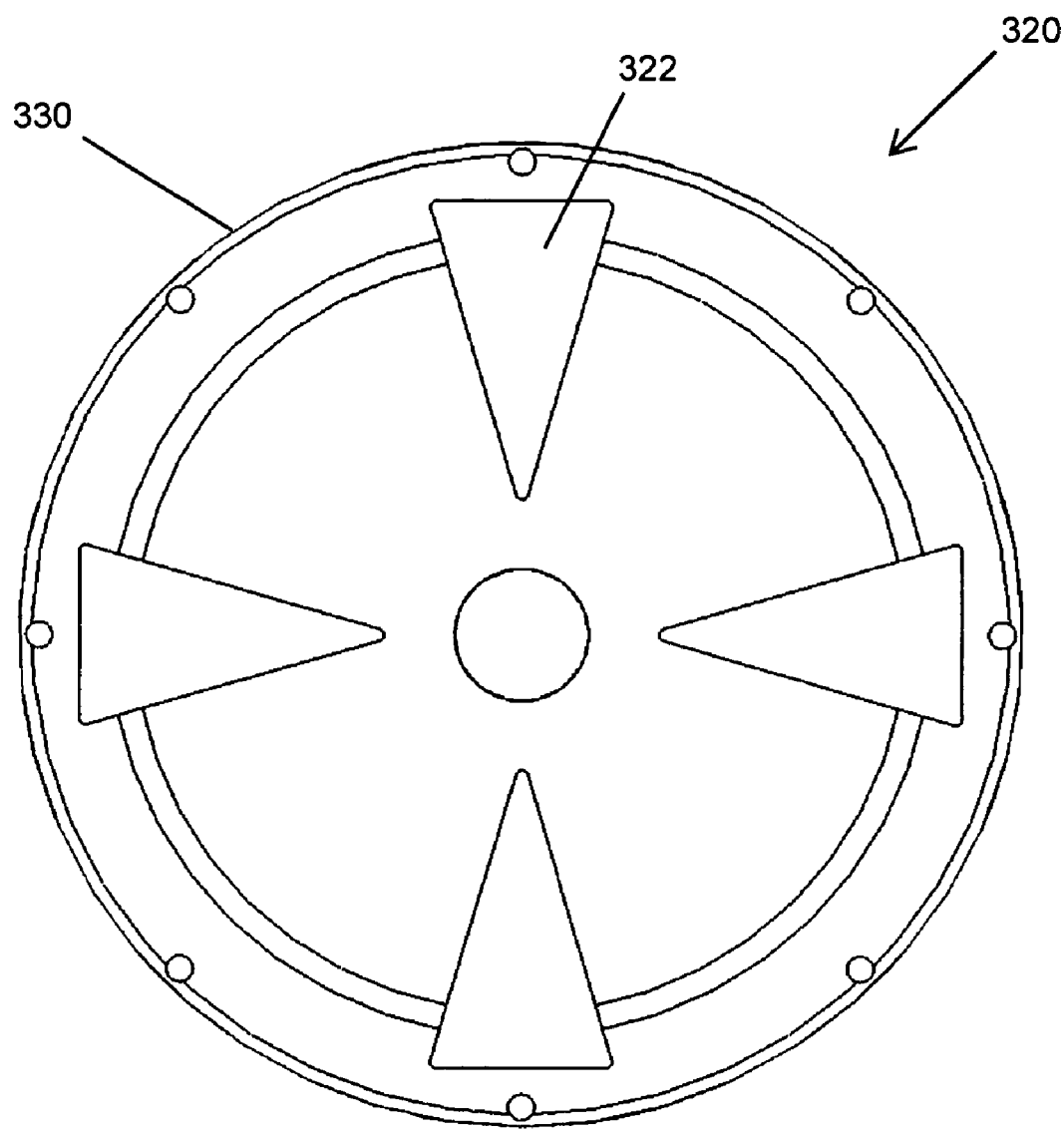
FIG. 3C is a top view of another example waveguide that may be used in the loudspeaker system in FIG. 1B.

FIGS. 3A-3C illustrate example waveguides that may be configured for use in a two-way loudspeaker system shown in FIG. 1C. FIG. 3A shows a first example of a waveguide 300 having 12 openings 302 that are identically sized and triangular in shape. The openings 302 radiate outward from the center 304 of the waveguide 300 forming a symmetrical pattern around the center 304. As described above, the waveguide 300 is assembled for use in the loudspeaker system in FIG. 1C in front of the woofer 122. The waveguide 300 is positioned such that the openings 302 are substantially aligned with the diaphragm of the woofer 126. The sound is output through the openings 302 and the area between the openings 302 covers the diaphragm creating a compression chamber for the woofer when the diaphragm vibrates. In example implementations of the waveguide 300, the size of the openings 302 and the number of openings 302 on the waveguide 300 are adjusted to permit the waveguide 300 to operate as an acoustical filter that will pass low frequencies.

FIGS. 3B and 3C show two additional example waveguides 310 and 320 having 24 openings 312 and four openings 322, respectively. The waveguide 320 is shown from a top view. The waveguide 320 has depth to allow it to operate as a tweeter waveguide. The waveguide 320 has an outer rim 330, or mouth. The overall size of the waveguide set by the diameter of the outer rim 330 determines the lowest frequency at which the waveguide will control the pattern coverage of the tweeter. Below this frequency the tweeter tends towards a more omni-directional behavior.

The openings 302, 312, 322 may be slots, or holes, or other openings of any shape. In addition, the waveguides 310, 312, 320 show the openings 302, 312, 322 extending radially from the center of the waveguide 310, 312, 320. In other implementations, the openings may be arranged along a circumferential pattern in the shape of annular concentric rings. This spacing between the openings, whether in an angular sense for radial slots, or in a radial sense for annular ring shaped openings, is one factor that affects the frequency response of the acoustic filter (parameter "w" in equations 4 and 5 below, and FIG. 4B).

It is noted that the waveguides 310, 312, 320 in FIGS. 3A-3C are round. However, the waveguide may be of any shape. In addition, the openings 302, 312, 322 and curvature of the waveguides 310, 312, 320 in FIGS. 3A-3C extend from the center of the waveguides 310, 312, 320 in a symmetrical curvature and pattern. However, the curvature need not extend from a geometric center nor be symmetrical in curvature or in the pattern of the openings. Any suitable shape and curvature may be used instead.

Figure 4A:
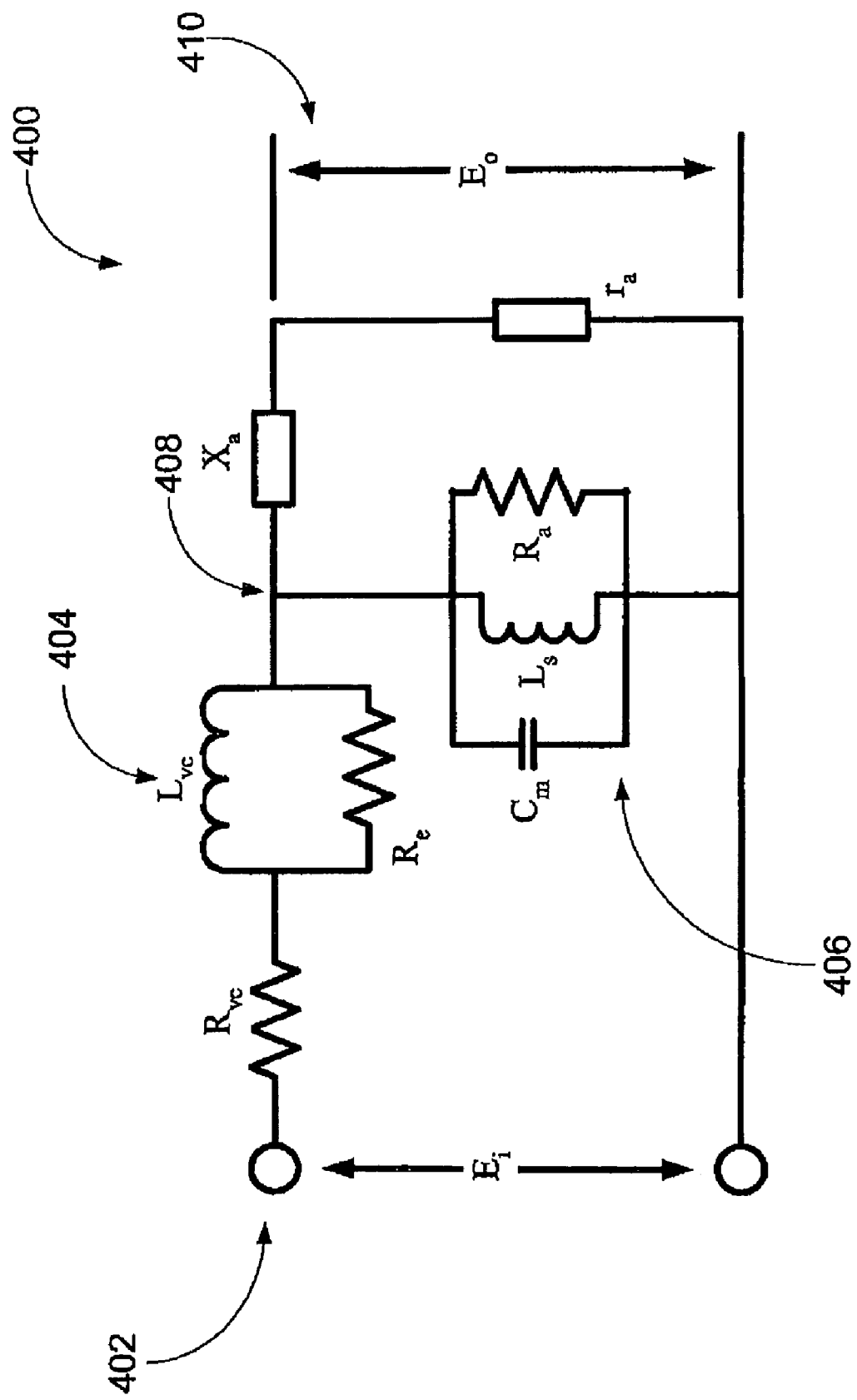
FIG. 4A is a circuit diagram depicting an electrical circuit equivalent of a loudspeaker system that may be used for modeling operation of the woofer and acoustical low pass filter combination.

As discussed above, the waveguide used in example loudspeaker systems may be configured using a model that predicts the behavior of the waveguide and selecting values for variable parameters of the model to achieve a desired behavior. FIG. 4A is a circuit diagram 400 depicting an electrical circuit equivalent of a loudspeaker system that may be used for modeling operation of the woofer and waveguide portion of the loudspeaker system. The circuit diagram 400 described with reference to FIG. 4A is similar and its use is analogous to a model for designing a phasing plug. An example of such a model is described in Kinoshita, Yoshimi, Hamada, and Locanthi, "Design of 48 mm. Beryllium Diaphragm Compression Driver," Audio Engineering Society Preprint, 60$^{th}$ Audio Engineering Society Convention in Los Angeles, Calif., May 2-5, 1978. The description of the use of the circuit diagram 400 that follows is based on using a waveguide similar to the waveguides 300, 310, and 320 described with reference to FIGS. 3A-3C. Those of ordinary skill in the art will appreciate that other opening shapes and waveguide profiles may be used as well.

The components in the circuit 400 in FIG. 4A include a resistor $R_{VC}$ at an input 402 to the circuit 400. The resistor $R_{VC}$ is in series connection with a first parallel combination 404 of a voice coil inductor $L_{VC}$ and $R_e$. The resistor $R_e$ is the eddy current loss in the center pole. The first parallel combination 404 connects to a first node 408, which further connects to a second parallel combination 406 and the impedance at an output 410 of the circuit 400. The impedance at the output 410 includes the reactance, $x_a$, and resistance, $r_a$, at the output 410.

The circuit diagram 400 may be used to determine a theoretical sound pressure level measurement based on the values of the components in the circuit diagram 400 and on characteristics of the phaseplug (in this case the waveguide is acting as a phaseplug for the woofer). The sound pressure level (SPL) may be determined by solving for SPL in Equation 1 below.

$$SPL = 10\log\left(\frac{1}{S_t \times 10^{-12}}\right) + 10\log\frac{E_0^2}{r_a} \quad \text{Eq. 1}$$

In Equation 1, the value $S_t$ is simply a scaling factor that accounts for the area into which the energy is radiated and does not affect the shape of the frequency response. This constant first term may be ignored in the present context. The value Eo may be determined from the following:

$$E_o = \text{Mod}\left[\frac{V_{in} \cdot Z_p \cdot r_a}{(Z_s + Z_p) \cdot (r_a + jx_a)}\right] \quad \text{Eq. 2}$$

The values of $Z_s$ and $Z_p$ are the series and parallel impedances, respectively, of the circuit in FIG. 4A. The values of $Z_s$ and $Z_p$ may be determined using circuit analysis given the components shown in the circuit.

The resistor $r_a$ is connected to the output 410 of the circuit diagram 400. The output signal, $E_O$, is the voltage across the resistor $r_a$. The term $x_a$ is the reactance at the output of the circuit in FIG. 4A.

$$r_a = \text{Re}\left(\frac{B^2 l^2}{r_{aM} + x_{aM}}\right) \quad \text{Eq. 3}$$

$$x_a = \text{Im}\left(\frac{B^2 l^2}{r_{aM} + x_{aM}}\right) \quad \text{Eq. 4}$$

In Eq. 3, Re signifies the real part of the complex expression in the parenthesis. In Eq. 4, Im signifies the imaginary part of the complex expression in the parenthesis. The term B is the magnetic flux density of the woofer driver. The term, l, is the length of the woofer voice coil wire immersed in the magnetic field. The terms $r_{aM}$ and $x_{aM}$ are the mechanical radiation resistance and reactance, respectively, referred to the diaphragm and calculated with the following equations:

$$r_{aM} = \rho_0 c S_0 T^2 \left(\frac{1}{k^2 h^2 T^2 + k^2 w^2 \cot^2 kw}\right) \quad \text{Eq. 5}$$

$$x_{aM} = -j\left(\frac{\rho_0 c S_0 T}{kh}\right)\left(1 - \left[\frac{1}{kw\cot kw + \left(\frac{hT}{w}\right)^2 kw\tan kw}\right]\right) \quad \text{Eq. 6}$$

where, the terms in Eqs. 5 and 6 are defined as follows:
 $S_0$=area of the openings;
 T=ratio–area of diaphragm/$S_0$;
 h=distance of air gap between the diaphragm and the surface of the waveguide;
 w=½ width between openings;
 $\rho_0$=density of air;
 c=velocity of sound in the air gap;
 k=2πf/c; and
 f=frequency.

Figure 4B:
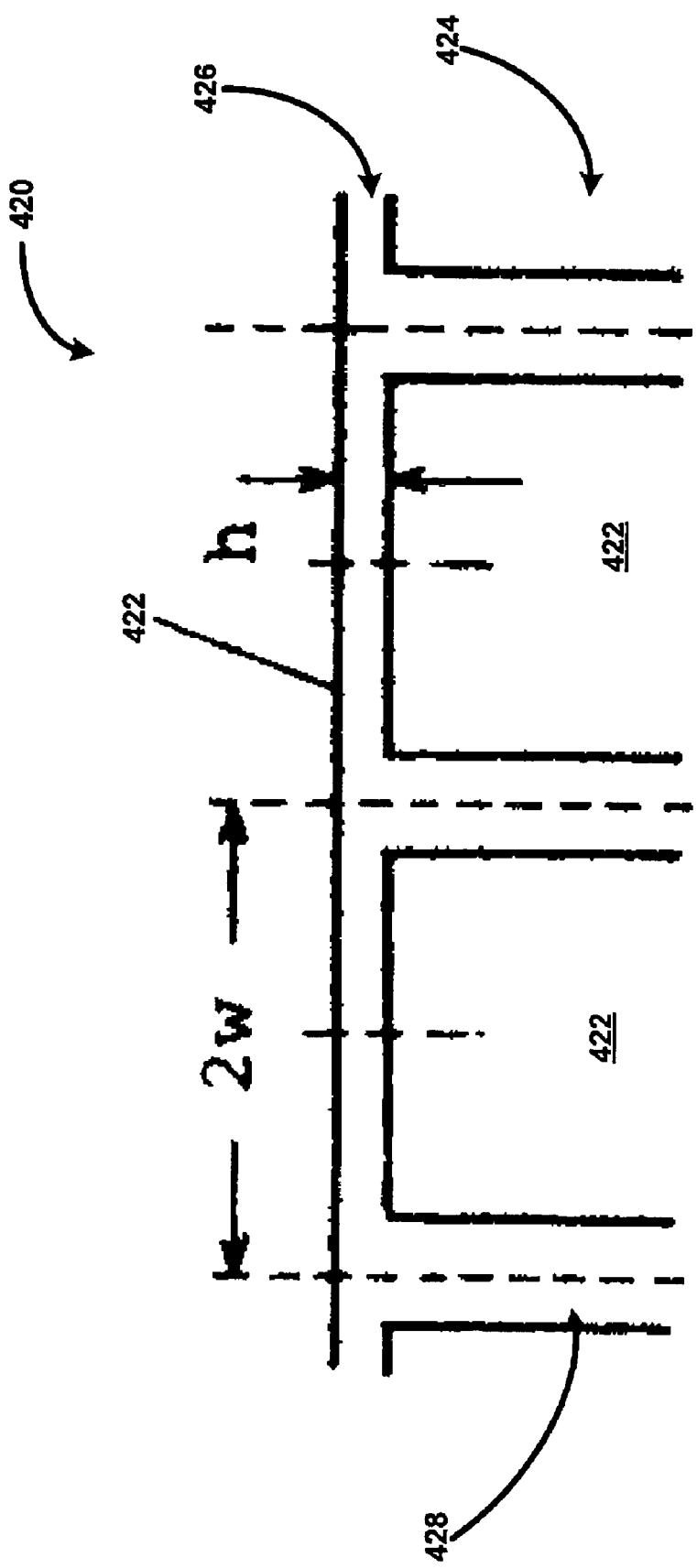
FIG. 4B is a schematic diagram of a portion of an acoustical radiating surface overlaid by a slotted waveguide in parallel with the acoustical radiating surface illustrating dimensions used to model operation of the waveguide.

FIG. 4B is a schematic diagram of a portion 420 of an acoustical radiating surface 422 (such as a diaphragm) overlaid by a slotted waveguide 424 in parallel with the acoustical radiating surface 422 illustrating the dimensions k and w used in the equations above. The slotted waveguide 424 includes slots 428 between walls 430. The walls 430 and acoustic radiating surface 422 form a gap 426 which forms the compression chamber for the woofer. As shown in FIG. 4B, the value of w is determined from the distance 2w between centers of the adjacent gaps 428. The value h is the distance between the acoustic radiating surface 422 and the surface of the wall 430 that forms the compression chamber.

Referring back to FIG. 4A, the second parallel combination 406 includes a capacitance, $C_m$; an inductance, $L_s$; and $R_b$, a radiation resistance of the diaphragm to the back side, which may be defined as follows:

$$C_m = \frac{M}{(Bl)^2}, \quad \text{Eq. 7}$$

where $M$ is the total mass of the diaphragm.

$$L_s = C_s(Bl)^2, \text{ where } C_s \text{ is the compliance of suspension.} \quad \text{Eq. 8}$$

$$R_b = \frac{(Bl)^2}{\rho_0 c S_d}, \quad \text{Eq. 9}$$

where $S_d$ is the area of the diaphragm.

As shown in Eqs. 1-9 above, the circuit diagram 400 in FIG. 4A may be used to model the frequency response of a driver/phase plug combination. In this case, the driver is the woofer, and the phaseplug can be considered to be the waveguide. The openings in the waveguide correspond to the openings in a phase plug. Typically, a specific woofer is selected for the loudspeaker system. The woofer selected determines the following parameters used in the model: B, l, $R_e$, M, $C_s$, and $S_d$. The parameters $\rho_0$ (density of air) and c (velocity of sound in the air gap) are physical constants. k and f depend on the frequency value at any given point since the frequency is the x-axis of the frequency response curve. The following parameters may be varied to test selected waveguides: $S_o$, T, h, and w. The $S_o$, T, w parameters characterize the waveguide: $S_o$ corresponds to the total area of the openings in the waveguide; T corresponds to the ratio of total woofer diaphragm area to So (otherwise known as the "compression ratio"); and w corresponds to the ½ width between openings.

The h parameter is the distance between the waveguide and the woofer diaphragm. In the described example implementations, the $S_0$, T, h, and w parameters are the variable parameters that may be adjusted to achieve a desired performance of the waveguide as an acoustical low pass filter given a selected woofer.

Figure 4C:
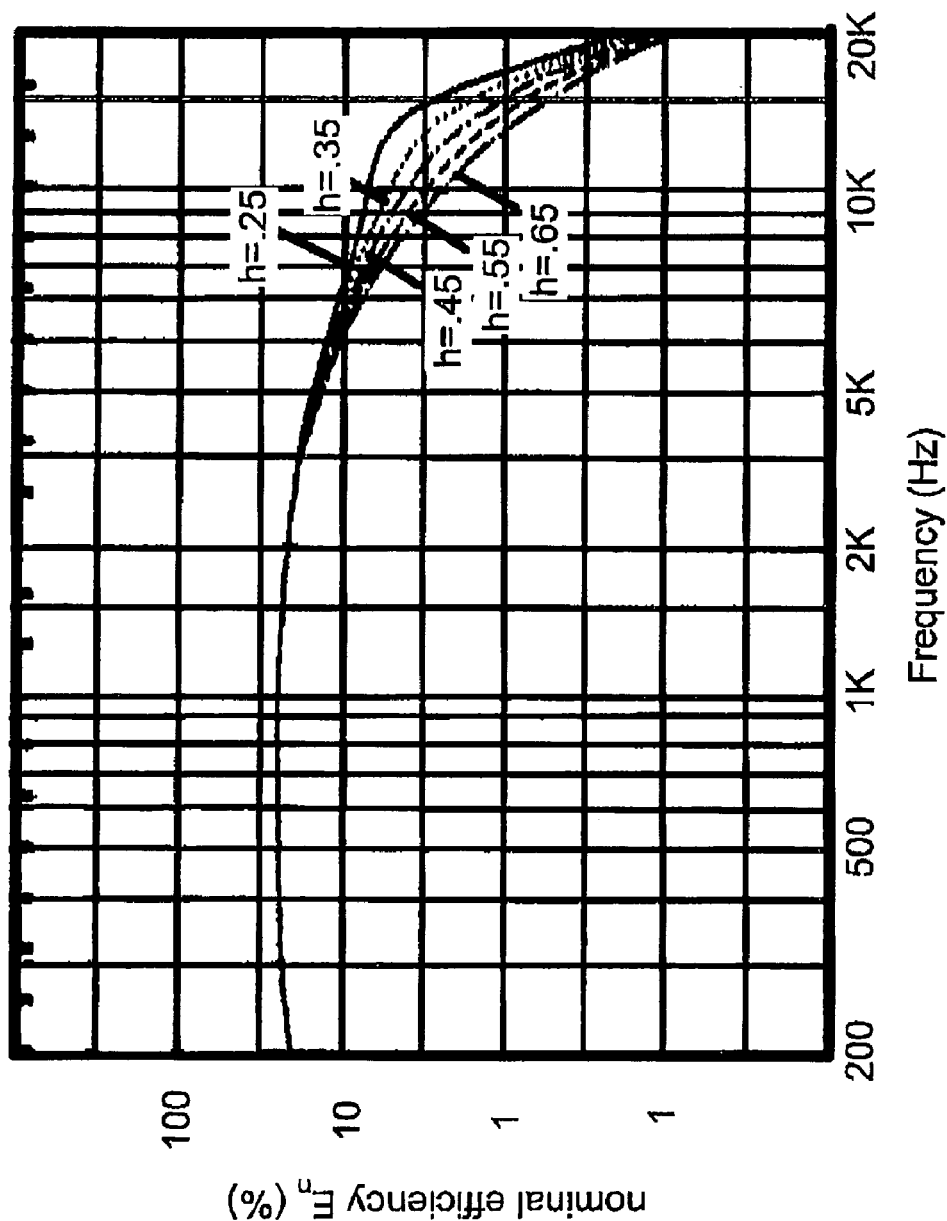
FIGS. 4C and 4D are frequency responses illustrating the effect of varying the h and w dimensions in the model described with reference to FIG. 4A.
Figure 4D:
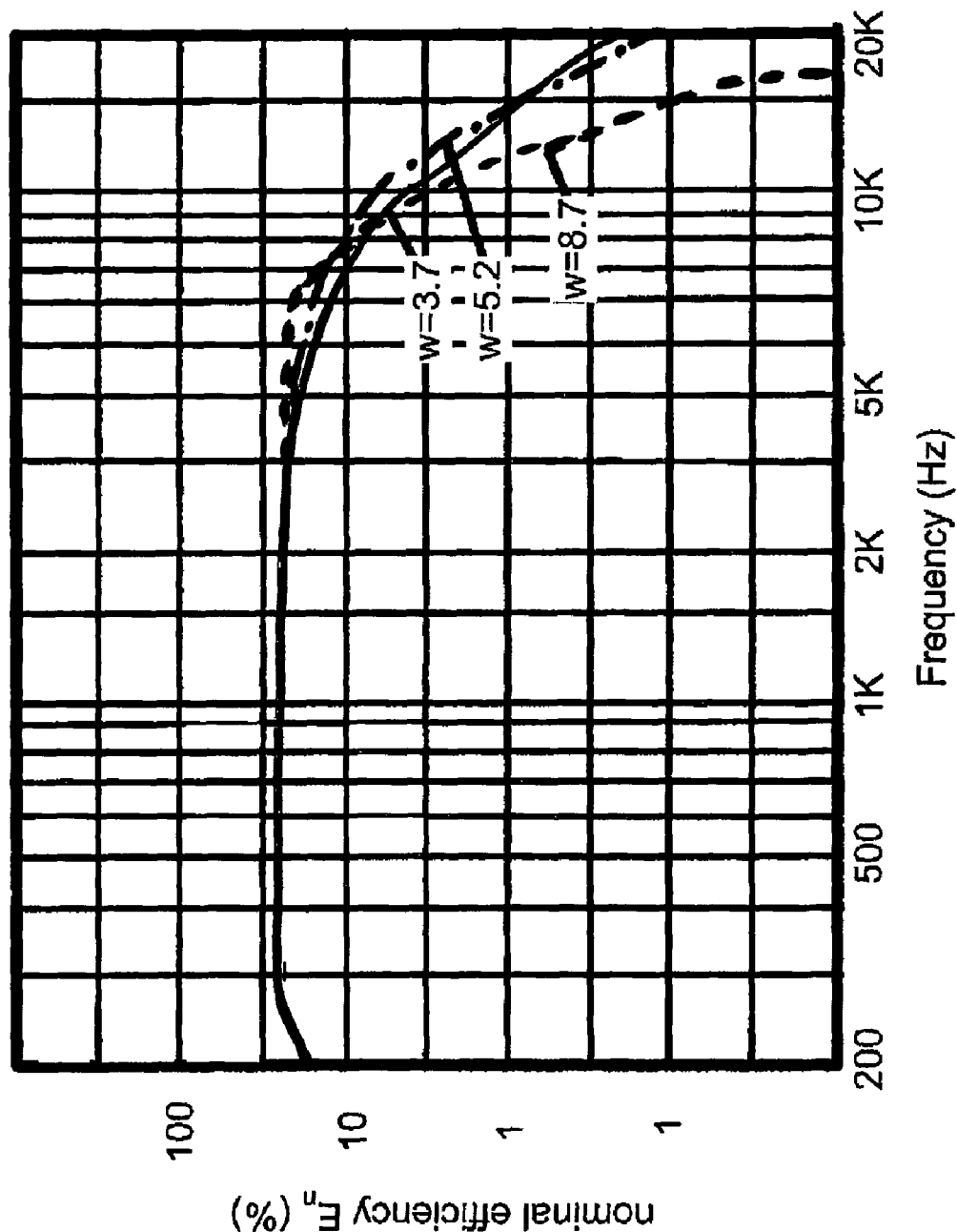

The effect of varying h and w in configuring the waveguide may be predicted by referring to examples of using the model described with reference to FIG. 4A in the design of a phasing plug. FIGS. 4C and 4D are frequency responses illustrating the effect of varying the h and w dimensions in the model described with reference to FIG. 4A. FIG. 4C illustrates the effect of varying the distance between the diaphragm and the phasing plug; or the h dimension. FIG. 4D illustrates the effect of varying the distance between the slots; or the w dimension.

Figure 4E:
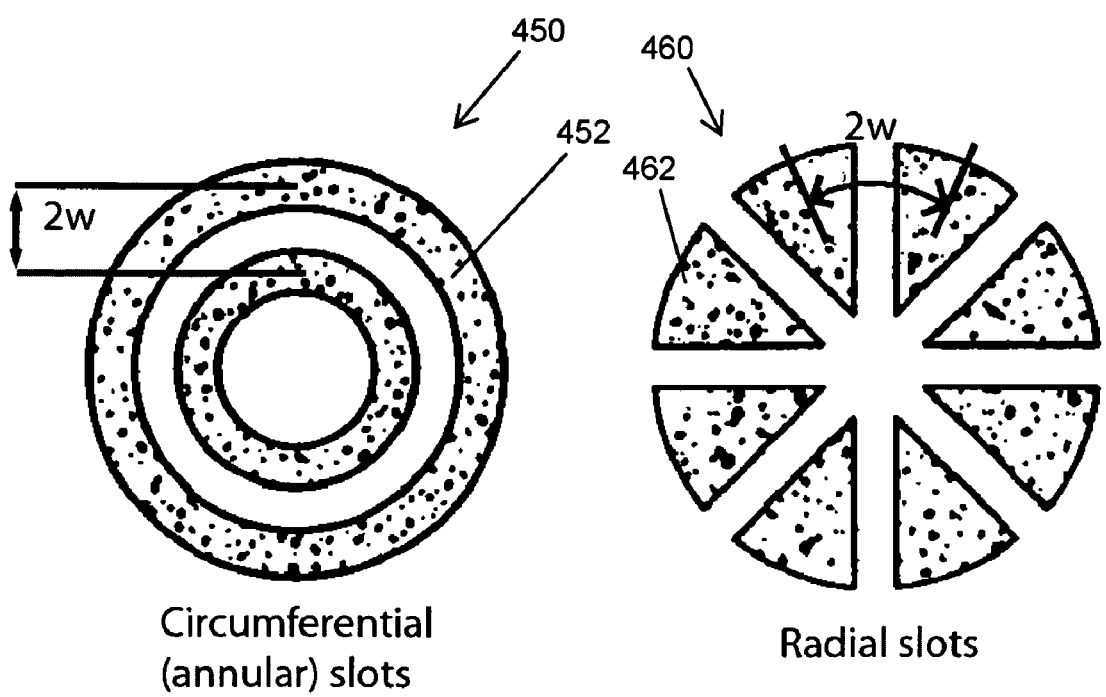
FIG. 4E depicts example waveguide slot configurations illustrating the h dimension for each configuration for the model described with reference to FIG. 4A.

It is noted that w is measured along a circumference around a center in the waveguide for the waveguides described with reference to FIGS. 3A-3C because the openings 322 are radial openings. In an implementation where the openings are circumferential in the shape of concentric annular rings, w would be measured along a radial direction. FIG. 4E depicts example waveguide slot configurations illustrating the w dimension for each configuration for the model described with reference to FIG. 4A. FIG. 4E shows a first waveguide slot configuration 450 having annular slots 452. In the first waveguide configuration 450, the w dimension is defined as half the distance between the circumference at a halfway point of one of the slots and the circumference at a halfway point of the next slot in the radial direction as shown in FIG. 4E. FIG. 4E also shows a second waveguide slot configuration 460 having radial slots 462. In the second waveguide configuration 460, the w dimension is defined as half the distance between the radius at a halfway point of one of the slots and the radius at a halfway point of the next slot in the circumferential direction as shown in FIG. 4E.

Figure 5:
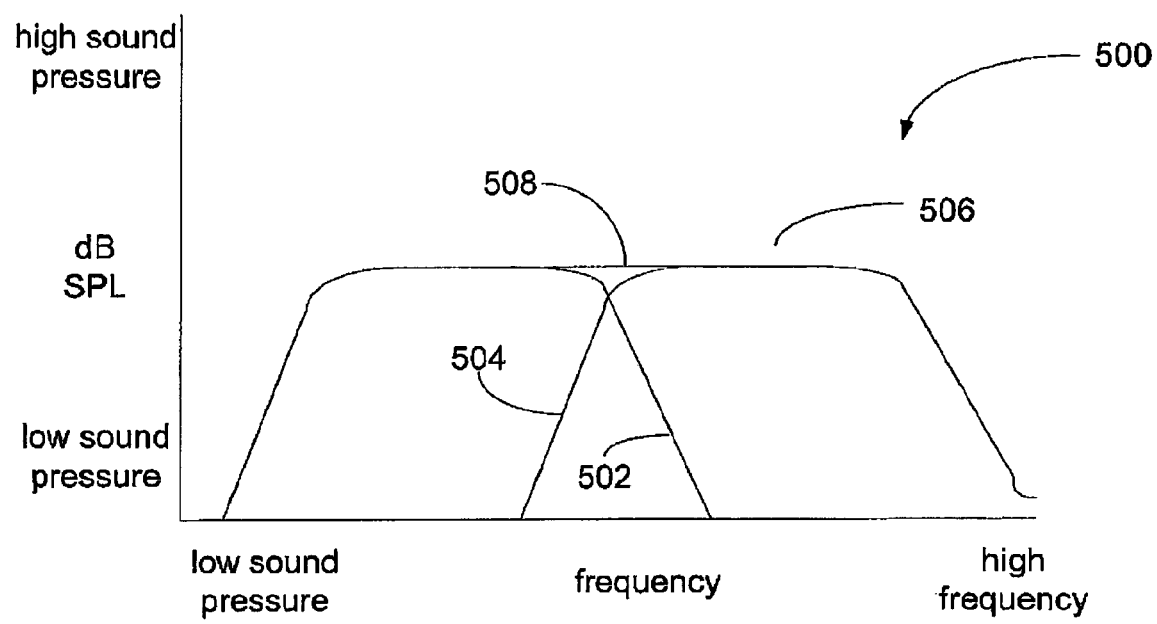
FIG. 5 depicts ideal frequency responses at low and high frequency ranges and an example frequency response generated by measurement.

FIG. 5 depicts ideal frequency responses at low and high frequency ranges and an example frequency response representative of an actual measurement. The frequency responses are shown as plots of sound pressure levels (SPL) against frequency. The SPL may be determined from measurements using a microphone placed near the output surface of the loudspeaker system and a frequency generator to excite the loudspeaker system. The frequency generator may be connected to either the woofer, the tweeter, or the common input to both woofer and tweeter. In example implementations of the loudspeaker system, a crossover network for the woofer is neither used nor required, which is confirmed by the frequency response curves generated as described with reference to FIGS. 6-9.

The frequency response curves may also be generated using the model described above with reference to FIG. 4A. In general, the model described above with reference to FIG. 4A is used to generate frequency response curves to determine the performance of the waveguide as an acoustical low pass filter given selected values of the variable parameters of the model. Once values of the variable parameters have been determined to provide an acceptable low pass filter response, a prototype waveguide may be constructed using the selected values of the variable parameters that characterize the waveguide. The prototype waveguide may be assembled in the loudspeaker system according to any other selected values of variable parameters, such as the air gap distance between the waveguide and diaphragm.

Referring to FIG. 5, the ideal frequency responses are two bandpass responses with the proper amount of overlapping area between them. The right side of response 502 is called a low pass response, while the left side of response 504 is called a high pass response. FIG. 5 includes a combined low-high frequency response 508, which is the result obtained when responses 502 and 504 are summed. The combined low-high frequency response 508 may be generated by exciting the common input of the woofer and tweeter in the same way as it will be driven in actual use.

In an ideal frequency response, the combined low-high frequency response 508 is the sum of the low pass frequency response 502 of the woofer and the high pass frequency response 504 of the tweeter. In reality, the frequency response of the low frequency portion generated by the woofer will typically look like the measured frequency response 506 in FIG. 5. The woofer, in particular, may generate energy (at 506) at frequencies higher than the desired low pass frequency cutoff. In typical applications, an electrical cross-over network is designed to eliminate the excess energy. Implementations of waveguides designed according to the model described above with reference to FIG. 4A may transform a woofer response from that of response 506 into that approximating response 502 without the use of an additional electrical crossover network.

Figure 6:
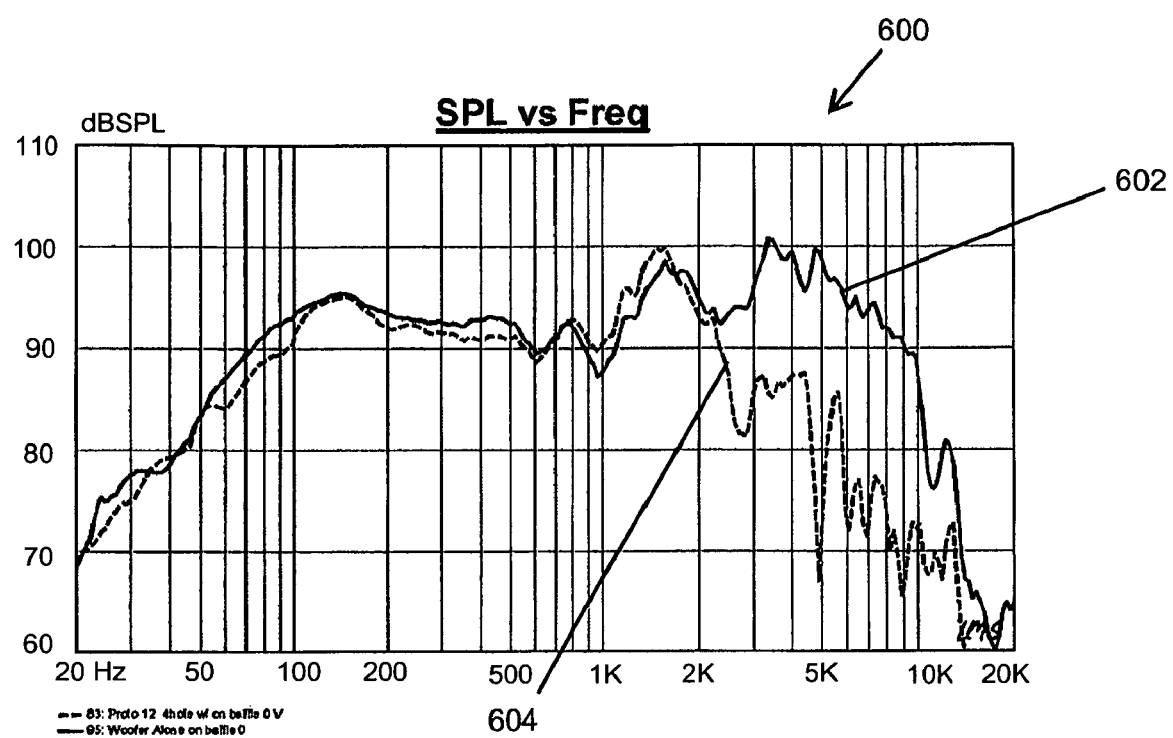
FIG. 6 depicts frequency response curves generated with and without the waveguide acting as a low pass filter, by driving various configurations of a loudspeaker system illustrating the effects of a specified number of openings in the waveguide.

FIG. 6 depicts frequency response curves 600 generated by driving various configurations of a loudspeaker system illustrating the effects of a specified number of openings in the waveguide. The frequency response curves 600 include:
1. a first frequency response 602 with no waveguide driving the woofer only through the entire frequency range.
2. a second frequency response 604 with a four-opening waveguide similar to the waveguide 320 shown in FIG. 3C and driving the woofer only through the entire frequency range.

The first frequency response curve 604 in FIG. 6 has a significant response at higher frequencies leading to excessive overlap with the frequency range where the tweeter would operate. This excessive high frequency output is generally undesirable. Using a waveguide configured as described above with reference to FIGS. 2A-4A, the woofer is driven through the entire operating frequency range to generate the second frequency response 604. The second frequency response 604 has a substantially reduced response at higher frequencies, which illustrates the waveguide's operation as an acoustical low pass filter.

Figure 7:
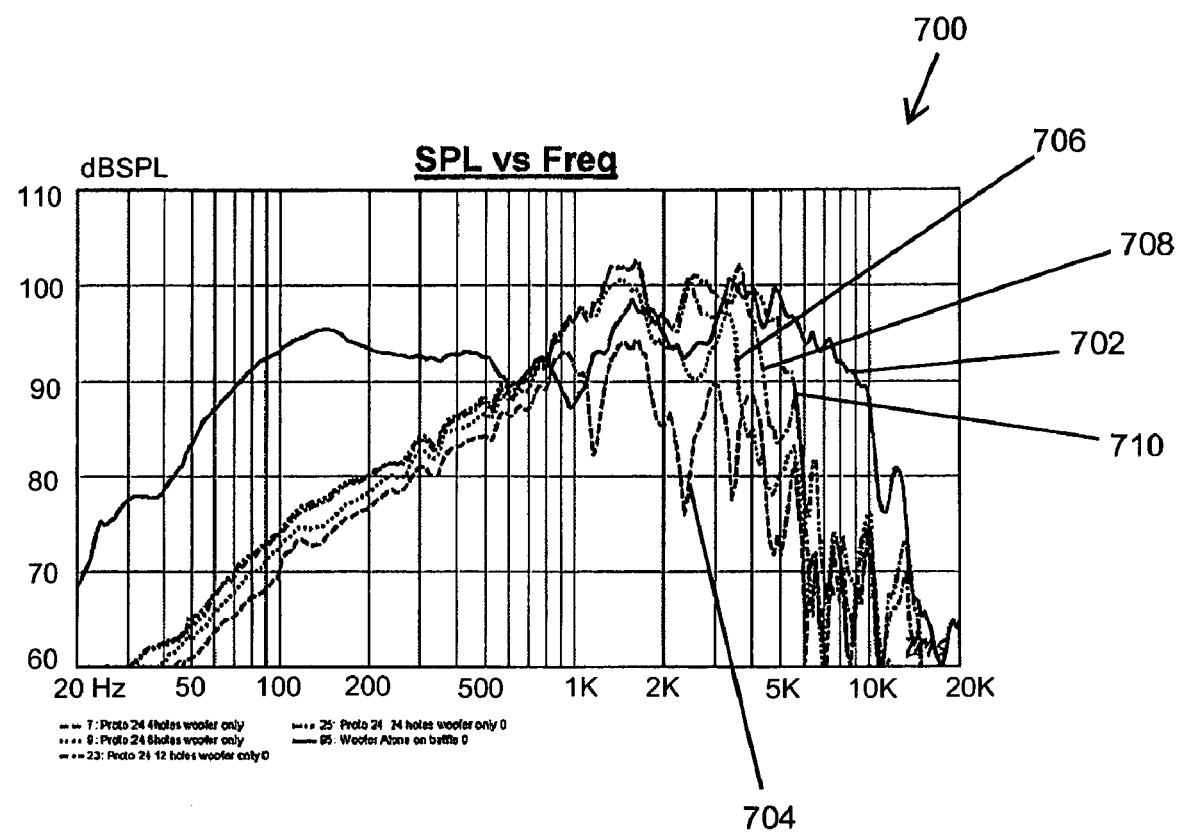
FIG. 7 depicts frequency response curves generated by driving various configurations of a loudspeaker system illustrating the frequency filtering effects on the woofer of varying the number of openings in the waveguide. Note that both high pass and low pass filter effects are seen. In an optimized system there would be no high pass filtering effects.

FIG. 7 depicts frequency response curves 700 generated by driving various configurations of a loudspeaker system illustrating the effects of varying the number of openings in the waveguide. The waveguide used to generate the curves 700 in FIG. 7 may be similar to the waveguide 310 in FIG. 3B. The waveguide 310 in FIG. 3B has 24 openings 312. The number of openings 312 may be adjusted to generate each frequency response curve 700 in FIG. 7 by covering a number of openings 312 to leave the desired number of openings 312 open. The openings 312 that remain open are arranged in a symmetrical pattern. The openings 312 may be closed by fastening pieces of the same material as the waveguide and in the same shape as the openings 312 to the openings selected for closing.

The frequency response curves 700 include:
1. a first frequency response 702 of the woofer only with no waveguide present as a reference.
2. a second frequency response 704 driving the woofer only and using the waveguide 310 of FIG. 3B with only 4 symmetrically located openings 312 left open in a pattern similar to that shown in FIG. 3C.
3. a third frequency response 706 driving the woofer only and using the waveguide 310 of FIG. 3B with only 8 symmetrically located openings 312 left open.
4. a fourth frequency response 708 driving the woofer only and using the waveguide 310 of FIG. 3B with only 12 symmetrically located openings 312 left open by covering every other opening, leaving 12 uniformly spaced openings.
5. a fifth frequency response 710 driving the woofer only and using the waveguide of FIG. 3B with all 24 openings left open.

The first frequency response curve 702 in FIG. 7 is shown to provide a reference curve. As shown by the first frequency response curve 702, the woofer operates with no low pass filtering. Of the remaining frequency response curves, the second frequency response curve 704 provides the most effective low pass filtering. It is noted that all of the openings 312 in the waveguides tested were the same size, which may leave too little open area for the energy to radiate out of the speaker system at frequencies below about 500 hz. In this case, both high pass and low pass filter effects are seen. In an optimized system with enough total open area, the high pass filtering effects would have been avoided.

Figure 8:
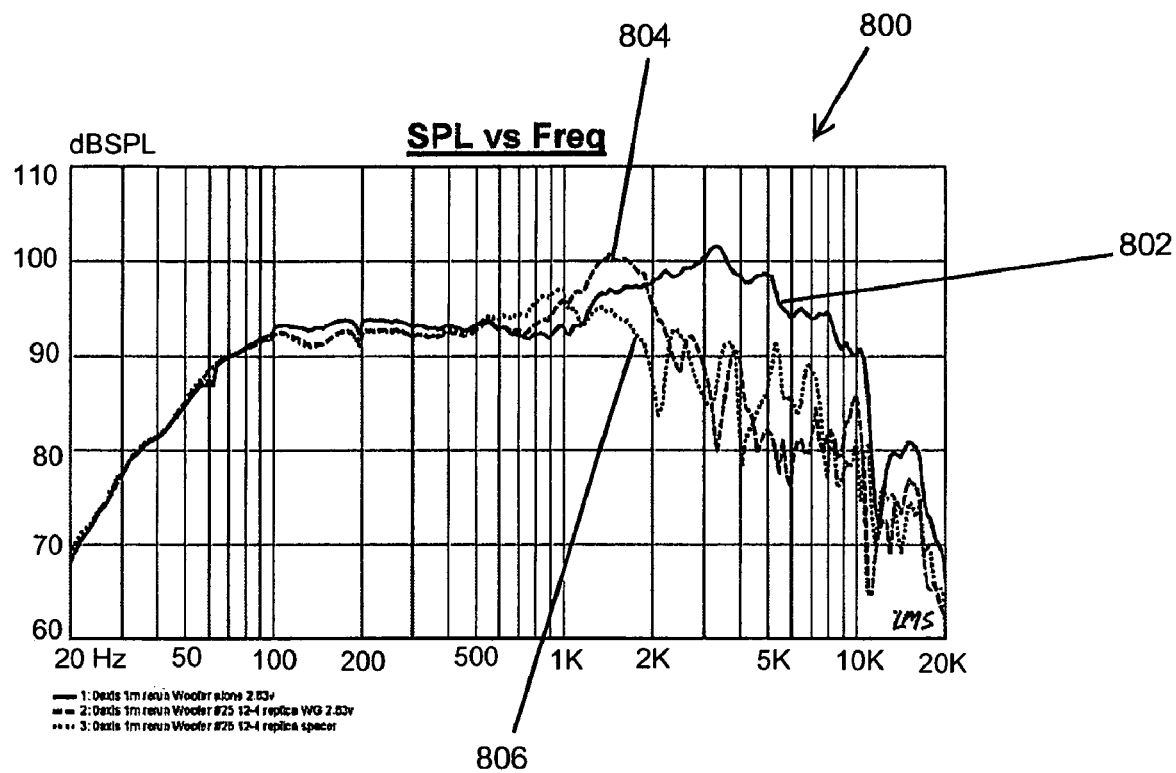
FIG. 8 depicts frequency response curves generated by driving various configurations of a loudspeaker system illustrating the effects on the woofer of varying the spacing between the waveguide and the woofer cone.

FIG. 8 depicts frequency response curves 800 generated by driving various configurations of a loudspeaker system illustrating the effects of varying the spacing between waveguide and diaphragm. The frequency response curves 800 include:
1. a first frequency response 802 of the woofer only with no waveguide used in the assembly.
2. a second frequency response 804 of the speaker system having a four-opening waveguide similar to the waveguide 320 shown in FIG. 3C and driving the woofer only through the entire frequency range.
3. a third frequency response 806 of a speaker system having a four-opening waveguide similar to the waveguide 320 shown in FIG. 3C with an additional spacer of approximately 6 mm added between the waveguide and the frame of the woofer to which the waveguide was fastened, while driving the woofer only through the entire frequency range.

The first frequency response curve 802 in FIG. 8 is shown to provide a reference curve. Both the second and third frequency response curves 804, 806 illustrate that use of the waveguide provides an acoustical low pass filter. The second frequency response curve 804 has a peak at about 1.5 khz. In the third frequency response curve 806, the peak at 1.5 khz is reduced illustrating the effect of a spacer provided to increase the distance between the waveguide and the diaphragm.

Figure 9:
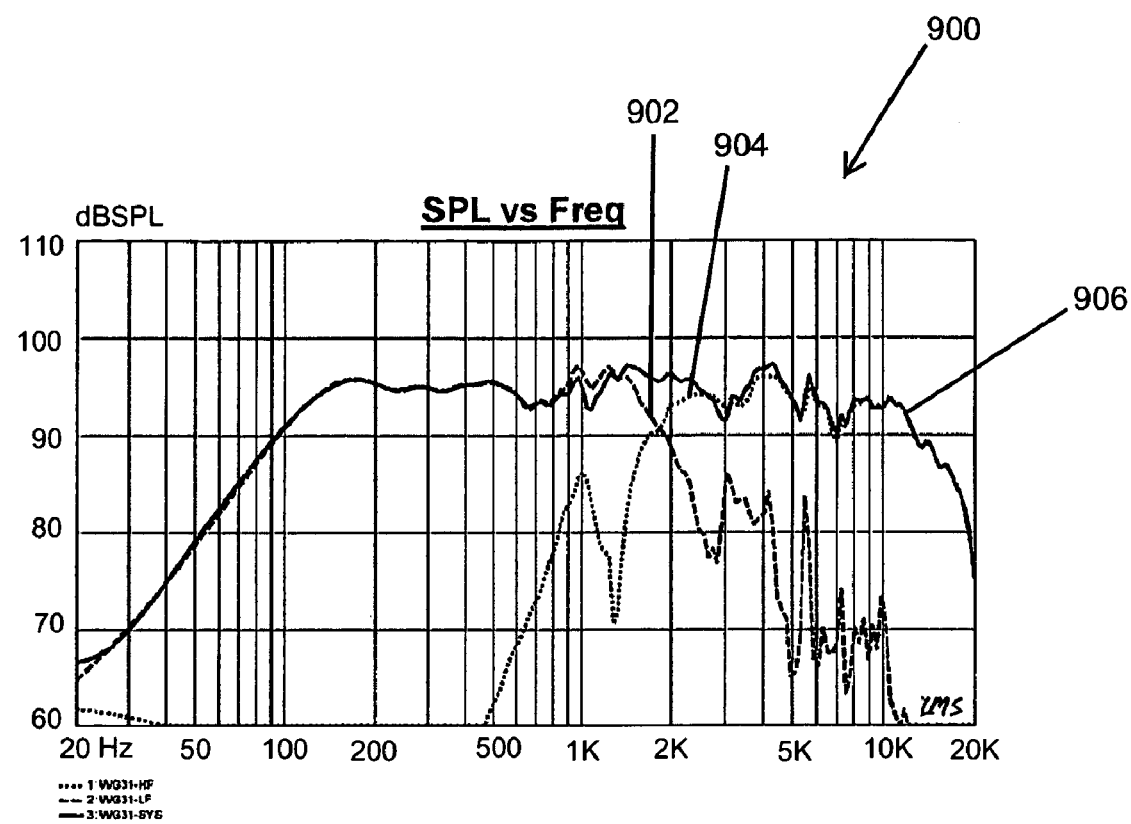
FIG. 9 depicts frequency response curves for an example loudspeaker system that approximate the ideal frequency response shown in FIG. 5.

FIG. 9 depicts frequency response curves 900 generated by driving a loudspeaker system to illustrate the use of an optimized waveguide as described here configured to operate as a tweeter waveguide and an acoustical low-pass filter. The waveguide used in this example implementation is similar to the four-opening waveguide 320 shown in FIG. 3C. The tweeter has a simple capacitor in series to provide an electrical high pass for the protection of the tweeter.

The frequency response curves 900 include:
1. a first frequency response 902 of the speaker system with only the woofer connected and driven through the entire operating frequency range.
2. a second frequency response 904 is the speaker system with only the tweeter connected through the capacitor, driven through the entire operating frequency range.
3. a third frequency response 906 of the complete loudspeaker system driven through the entire operating frequency range.

The frequency response curves 900 in FIG. 9 illustrate an example of a measured frequency response that approximates the ideal frequency responses 502, 504, and 508 shown in FIG. 5. The first frequency response curve 902 in FIG. 9 illustrates the operation of the waveguide configured as an acoustical low pass filter. The second frequency response curve 904 illustrates operation of the waveguide as a tweeter waveguide. The third frequency response curve 906 illustrates operation of the loudspeaker system over the entire operating frequency range. The loudspeaker system is driven as a system as it would be in normal operation such that the woofer and tweeter receive the input excitation signal through the entire frequency range without a crossover network except for perhaps a protection circuit or a frequency dividing circuit, which may include a single capacitor, in series with the tweeter.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A waveguide for mounting in a loudspeaker system comprising:
    an outer surface shaped to direct sound waves radiated from a first sound source positioned to generate the sound waves directed by the waveguide;
    an inner surface on a side opposite the outer surface; and
    a plurality of openings in the waveguide, each opening extending from the inner surface to the outer surface, the plurality of openings being disposed to overlay an acoustical radiating surface of a diaphragm of a second sound source mounted adjacent to the inner surface of the waveguide such that the inner surface of the waveguide covers the acoustical radiating surface of the diaphragm, the openings configured to enable the waveguide to function as an acoustical low pass filter for sound radiated through the openings from the second sound source where the function of the waveguide as the acoustical low pass filter depends on the distance between the diaphragm and the inner surface of the waveguide, the area between the openings creates a compression chamber between the inner surface of the waveguide and the acoustic radiating surface when the diaphragm of the second sound source vibrates, and a selected area of the openings, a ratio of area of the diaphragm to the area of the openings, and the distance between the diaphragm and the inner surface of the waveguide are selected by simulating operation of the second source using an equivalent electrical circuit model.

2. The waveguide of claim 1 where the openings are disposed in a radial pattern from the center of the waveguide.

3. The waveguide of claim 1 where the openings are disposed in a circumferential pattern around the center of the waveguide.

4. The waveguide of claim 1 further characterized by a profile that defines the outer surface by a depth, a curvature, number of openings and size, shape, and position of openings, the profile being selected for the waveguide according to a desired off-axis distribution of high frequency sound.

5. A loudspeaker system comprising:
a first sound source;
a second sound source having an acoustical radiating surface; and
a waveguide mounted acoustically in front of the second sound source such that the waveguide covers the acoustical radiating surface of the second sound source, the waveguide having:
an outer surface shaped to direct sound waves radiated from a sound source positioned at an opening in the waveguide;
an inner surface on a side opposite the outer surface; and
a plurality of openings in the waveguide, each opening extending from the inner surface to the outer surface, the plurality of openings being disposed to overlay the acoustical radiating surface of a diaphragm of the second sound source, the openings configured to enable the waveguide to function as an acoustical low pass filter for sound radiated through the openings from the second sound source where the function of the waveguide as the acoustical low pass filter depends on the distance between the diaphragm and the surface of the waveguide adjacent to the diaphragm, the area between the openings creates a compression chamber between the inner surface of the waveguide and the acoustic radiating surface when the diaphragm of the second sound source vibrates, and where a selected area of the openings, and ratio of area of the diaphragm to the area of the opening, the distance between openings, and the distance between the diaphragm and the surface of the waveguide adjacent to the diaphragm are selected by simulating operation of the waveguide with a selected low frequency sound driver using an equivalent electrical circuit model.

6. The loudspeaker system of claim 5 further comprising:
a sound source connection to receive an electrical signal to be converted to sound by the low and high frequency sound drivers, the sound source connection connected to the low and high frequency sound drivers without using a cross-over network.

7. The loudspeaker system of claim 5 further comprising:
a sound source connection to receive an electrical signal to be converted to sound by the low and high frequency sound drivers, the sound source connection connected to the low and high frequency sound drivers with a protection circuit connected to the high frequency sound driver.

8. The loudspeaker system of claim 5 where the openings on the waveguide are disposed in a radial pattern from the center of the waveguide.

9. The loudspeaker system of claim 5 where the openings on the waveguide are disposed in a circumferential pattern around the center of the waveguide.

10. The loudspeaker system of claim 5 where the waveguide is further characterized by a profile that defines the outer surface by a depth, a curvature, number of openings and size, shape, and position of openings, the profile being selected for the waveguide according to a desired off-axis distribution of high frequency sound.

* * * * *

UNITED STATES PATENT AND TRADEMARK OFFICE
CERTIFICATE OF CORRECTION

PATENT NO. : 8,130,994 B2
APPLICATION NO. : 12/141013
DATED : March 6, 2012
INVENTOR(S) : Button et al.

It is certified that error appears in the above-identified patent and that said Letters Patent is hereby corrected as shown below:

In FIG. 1C, the opening of the waveguide 146 currently labeled with reference numeral 142 should be labeled with reference numeral 141.

In FIG. 2B, the diamond-shaped step should be labeled with reference numeral 224.

In FIG. 4B, the walls of the slotted waveguide 424 should be labeled with reference numeral 430.

At column 5, line 21, "...openings 108, 128, 142..." should be changed to -- openings 108, 128, 141 --.

At column 5, line 23, "...openings 108, 128, 142" should be changed to -- openings 108, 128, 141 --.

At column 5, lines 25–26, "...openings 108, 128, 142..." should be changed to -- openings 108, 128, 141 --.

At column 8, line 34, "...woofer 122..." should be changed to -- woofer 124 --.

At column 8, line 36, "...woofer 126..." should be changed to -- woofer 124 --.

At column 8, line 49, "...the waveguide set" should be changed to -- the waveguide 320 set --.

At column 8, lines 55–56, "...waveguides 310, 312, 320..." should be changed to -- waveguides 300, 310, 320 --.

At column 8, line 57, "...waveguide 310, 312, 320..." should be changed to -- waveguides 300, 310, 320 --.

At column 8, line 65, "...waveguides 310, 312, 320..." should be changed to -- waveguides 300, 310, 320 --.

Signed and Sealed this
Twenty-ninth Day of January, 2013

David J. Kappos
*Director of the United States Patent and Trademark Office*

CERTIFICATE OF CORRECTION (continued)
U.S. Pat. No. 8,130,994 B2

At column 9, line 1, "...waveguides 310, 312, 320..." should be changed to -- waveguides 300, 310, 320 --.

At column 9, line 2, "...waveguides 310, 312, 320..." should be changed to -- ...waveguides 300, 310, 320... --.

At column 11, line 10, "...physical constants.k..." should be changed to -- ...physical constants, k... --.

At column 13, line 37, "...500 hz..." should be changed to -- ...500 Hz... --.

At column 13, line 62, "...1.5 khz..." should be changed to -- ...1.5 kHz... --.

At column 13, line 63, "...1.5 khz..." should be changed to -- ...1.5 kHz... --.

At column 14, line 64, claim 1 "...vibrates. and..." should be changed to -- ...vibrates, and... --.